(12) United States Patent
Nocon et al.

(10) Patent No.: US 12,420,215 B2
(45) Date of Patent: Sep. 23, 2025

(54) SAMPLE INJECTOR WITH SAMPLE FLUID FILTERING

(71) Applicant: Agilent Technologies, Inc., Santa Clara, CA (US)

(72) Inventors: Blasius Nocon, Waldbronn (DE); Thomas Ortmann, Straubenhardt/Ottenhausen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 517 days.

(21) Appl. No.: 17/801,767

(22) PCT Filed: Feb. 26, 2021

(86) PCT No.: PCT/IB2021/051599
§ 371 (c)(1),
(2) Date: Aug. 23, 2022

(87) PCT Pub. No.: WO2021/171232
PCT Pub. Date: Sep. 2, 2021

(65) Prior Publication Data
US 2023/0085894 A1     Mar. 23, 2023

(30) Foreign Application Priority Data
Feb. 28, 2020   (GB) ..................... 2002841

(51) Int. Cl.
*G01N 30/14*        (2006.01)
*B01D 15/12*        (2006.01)
(Continued)

(52) U.S. Cl.
CPC ........... B01D 15/125 (2013.01); G01N 30/14 (2013.01); G01N 30/16 (2013.01); *G01N 2030/027* (2013.01)

(58) Field of Classification Search
CPC ...... B01D 15/125; B01D 15/12; B01D 15/14; G01N 30/14; G01N 30/16;
(Continued)

(56) References Cited

U.S. PATENT DOCUMENTS 3,985,021 A * 10/1976 Achener ................ G01N 30/34
                                                                    73/61.56
4,921,618 A    5/1990 Hamlin
(Continued)

FOREIGN PATENT DOCUMENTS

| EP | 1093572 B1 | 11/2002 | |
|---|---|---|---|
| EP | 1577012 A1 | 9/2005 | |
| WO | WO-2009016431 A1 * | 2/2009 | ........... B01D 15/125 |

OTHER PUBLICATIONS

PCT Notification of Transmittal of The International Search Report & Written Opinion mailed on May 6, 2021 for Application No. PCT/IB2021/051599; 15 pages.

*Primary Examiner* — Joseph W Drodge

(57) ABSTRACT

A sample injector is provided for a chromatography system that includes a mobile phase drive and a separation unit. The mobile phase drive is configured for driving a mobile phase through the separation unit, and the separation unit is configured for chromatographically separating compounds of a sample fluid in the mobile phase. The sample injector is configured for injecting the sample fluid into the mobile phase and comprises a needle and a handling unit configured for positioning the needle. Operating the sample injector includes providing a receptacle that includes a filtration unit configured for filtering a sample fluid comprised within the receptacle, moving the filtration unit within the receptacle in order to filter at least a portion of the sample fluid contained in the receptacle, operating the handling unit to position the needle into the receptacle, and aspirating a volume of the filtered sample fluid.

20 Claims, 3 Drawing Sheets

(51) Int. Cl.
*G01N 30/16* (2006.01)
*G01N 30/02* (2006.01)

(58) Field of Classification Search
CPC ......... G01N 2030/027; G01N 35/1011; G01N 30/24; G01N 2030/146; G01N 30/146
See application file for complete search history.

(56) References Cited

U.S. PATENT DOCUMENTS

| | | |
|---|---|---|
| 4,982,597 A | 1/1991 | Berger |
| 5,567,309 A | 10/1996 | Classon et al. |
| 2002/0168778 A1* | 11/2002 | Andrien, Jr. ........ H01J 49/0445 422/68.1 |
| 2003/0087454 A1* | 5/2003 | Schultz ................ B01L 3/0275 436/178 |
| 2010/0224012 A1 | 9/2010 | Modic et al. |
| 2012/0228490 A1* | 9/2012 | Wu ...................... H01J 49/167 250/288 |
| 2014/0116159 A1* | 5/2014 | Zimmerman .......... G01N 30/16 73/863.01 |
| 2016/0187306 A1 | 6/2016 | Pohl et al. |
| 2016/0334031 A1 | 11/2016 | Shoykhet et al. |
| 2017/0343520 A1 | 11/2017 | Ortmann et al. |

\* cited by examiner

SAMPLE INJECTOR WITH SAMPLE FLUID FILTERING

RELATED APPLICATIONS

This application is the national stage under 35 U.S.C. 371 of International Application No. PCT/IB2021/051599, filed Feb. 26, 2021, which claims priority to UK Patent Application No. GB 2002841.1, filed Feb. 28, 2020; the entire contents of each of which are incorporated by reference herein.

TECHNICAL FIELD

The present invention relates to sample injection in particular for chromatographic sample separation.

BACKGROUND

For liquid separation in a chromatography system, a mobile phase comprising a sample fluid (e.g. a chemical or biological mixture) with compounds to be separated is driven through a stationary phase (such as a chromatographic column packing), thus separating different compounds of the sample fluid which may then be identified. The term compound, as used herein, shall cover compounds which might comprise one or more different components.

The mobile phase, for example a solvent, is pumped under high-pressure typically through a chromatographic column containing packing medium (also referred to as packing material or stationary phase). As the sample is carried through the column by the liquid flow, the different compounds, each one having a different affinity to the packing medium, move through the column at different speeds. Those compounds having greater affinity for the stationary phase move more slowly through the column than those having less affinity, and this speed differential results in the compounds being separated from one another as they pass through the column. The stationary phase is subject to a mechanical force generated in particular by a hydraulic pump that pumps the mobile phase usually from an upstream connection of the column to a downstream connection of the column. As a result of flow, depending on the physical properties of the stationary phase and the mobile phase, a relatively high-pressure drop is generated across the column.

The mobile phase with the separated compounds exits the column and passes through a detector, which registers and/or identifies the molecules, for example by spectrophotometric absorbance measurements. A two-dimensional plot of the detector measurements against elution time or volume, known as a chromatogram, may be made, and from the chromatogram the compounds may be identified. For each compound, the chromatogram displays a separate curve feature also designated as a "peak".

In preparative chromatography systems, a liquid as the mobile phase is provided usually at a controlled flow rate (e.g. in the range of 1 mL/min to thousands of mL/min, e.g. in analytical scale preparative LC in the range of 1-5 mL/min and preparative scale in the range of 4-200 mL/min) and at pressure in the range of tens to hundreds bar, e.g. 20-600 bar.

In high performance liquid chromatography (HPLC), a liquid as the mobile phase has to be provided usually at a very controlled flow rate (e.g. in the range of microliters to milliliters per minute) and at high-pressure (typically 20-100 MPa, 200-1000 bar, and beyond up to currently 200 MPa, 2000 bar) at which compressibility of the liquid becomes noticeable.

In preparative chromatography systems used for chromatography fluidically separating samples at a larger volume, typically in the range of 0.1 mL to tens of mL, there often is a need for analysing a smaller volume of such sample prior to running the separation of the larger volume (e.g. in the sense of an "analytical scouting run").

For such purpose, an analytical chromatography system may be used for chromatographically separating smaller sample volumes, typically in the range of 10 uL-50 ul. Such analytical chromatography system may be an HPLC system.

The Agilent Dual Loop Sampler G2258A, by the applicant Agilent Technologies, Inc., provides a sampling unit for a combined analytical and preparative chromatography system allowing to inject sample into the analytical as well as the preparative chromatography system.

In several applications, the sample fluid needs to be filtered e.g. before sample injection, which is typically manually applied as part of the sample preparation.

SUMMARY

It is an object of the invention to provide an improved sample preparation, in particular including filtering, preferably for chromatographic sample separation.

According to some embodiments of the present invention, methods of operating a sample injector for a chromatography system are provided. The chromatography system comprises a mobile phase drive and a separation unit, wherein the mobile phase drive is configured for driving a mobile phase through the separation unit, and the separation unit is configured for chromatographically separating compounds of a sample fluid in the mobile phase. The sample injector is configured for injecting the sample fluid into the mobile phase and comprises a needle and a handling unit configured for positioning the needle. A preferred method of operating the sample injector comprises providing a receptacle comprising a filtration unit configured for filtering a sample fluid comprised within the receptacle, moving (preferably pushing) the filtration unit within the receptacle in order to filter at least a portion of the sample fluid contained in the receptacle, operating the handling unit to position the needle into the receptacle, and aspirating a volume of the filtered sample fluid. This allows to provide an automated filtering of the sample fluid provided by the sample injector. Such automated filtering may be part of a workflow e.g. using specific filtration receptacles (e.g. vials) for automatically filtering the sample fluid e.g. before injection into the mobile phase.

Moving the filtration unit within the receptacle and operating the handling unit to position the needle into the receptacle can be provided in parallel or in any sequential order, dependent on the specific embodiment. For example, the needle may already be positioned into the receptacle before the filtration unit is moved within the receptacle, or the other way around.

In one embodiment, moving the filtration unit within the receptacle comprises moving the filtration unit from an upper position proximate to an opening of the receptacle towards a lower position proximate to a bottom side of the receptacle, wherein the opening is configured for receiving the needle into the receptacle. This allows to push the sample fluid through the filtration unit for filtering the sample fluid.

In one embodiment, moving the filtration unit within the receptacle comprises operating the handling unit to move the filtration unit within the receptacle in order to filter at least a portion of the sample fluid contained in the receptacle. The handling unit can fully automatically provide the process of filtration by operating on and moving the filtration unit.

In one embodiment, moving the filtration unit within the receptacle comprises operating a further unit (e.g. a gripper or pusher) of the sample injector to move the filtration unit within the receptacle in order to filter at least a portion of the sample fluid contained in the receptacle. The further unit may be a unit being (more or less) integrated into the handling unit or any other part of the sample injector. The further unit may be embodied as a pusher which may also be used for removing the receptacle when for example the needle has been penetrated into the receptacle and is attached to the receptacle e.g. by frictional forces.

In one embodiment, moving the filtration unit within the receptacle comprises operating the needle to move the filtration unit within the receptacle in order to filter at least a portion of the sample fluid contained in the receptacle. In such embodiment, the needle may comprise a collar at a lateral side of the needle, so that the collar can be used e.g. to apply pushing pressure on the filtration unit. The collar may be provided as integral part of the needle, either by a joint manufacturing step or by later affixing the collar to the needle (e.g. by welding, bonding, or the like).

In one embodiment, operating the handling unit to position the needle into the receptacle comprises positioning the needle above the filtration unit, preferably positioning a tip of the needle as close as possible to an upper surface of the filtration unit, wherein the upper surface of the filtration unit is oriented adjacent to an opening of the receptacle.

One embodiment further comprises injecting at least a portion of the aspirated sample fluid into the mobile phase, thus allowing to provide e.g. a chromatographic separation of the injected sample fluid. Injection of the sample fluid may be done using a feed injection scheme, as described e.g. in US2017343520A1 by the same applicant. Alternatively or in addition, injection of the sample fluid may be done using a flow-through injection scheme, as described e.g. in US20160334031A1 by the same applicant. In the feed injection scheme, the sample fluid will be fluidically coupled to a coupling point between the mobile phase drive and the separation unit for combining a flow through the sampling volume with a flow of the mobile phase. In the flow-through or loop injection scheme, the sample fluid will be fluidically coupled between the mobile phase drive and the separation unit.

In one embodiment, a sample injector is provided for a chromatography system. The chromatography system comprises a mobile phase drive and a separation unit, wherein the mobile phase drive is configured for driving a mobile phase through the separation unit, and the separation unit is configured for chromatographically separating compounds of a sample fluid in the mobile phase. The sample injector is configured for injecting the sample fluid into the mobile phase and comprises a needle, a handling unit, and a processing unit. The handling unit is configured for positioning the needle with respect to a receptacle comprising a filtration unit configured for filtering a sample fluid comprised within the receptacle. The processing unit is configured for operating for moving the filtration unit within the receptacle in order to filter at least a portion of the sample fluid contained in the receptacle, for operating the handling unit to position the needle into the receptacle, and for aspirating a volume of the filtered sample fluid. This allows to provide a sample injector configured to apply an automated filtration process for the sample fluid.

In one embodiment, the sample injector comprises a further unit (e.g. a gripper or pusher) of the sample injector to move the filtration unit within the receptacle in order to filter at least a portion of the sample fluid contained in the receptacle. The further unit may be a unit being more or less integrated into the handling unit or any other part of the sample injector. The further unit may be embodied as a pusher which may also be used for removing the receptacle when for example the needle has been penetrated into the receptacle and is attached to the receptacle e.g. by frictional forces.

In one embodiment, the needle comprises a collar at a lateral side of the needle, and the handling unit is configured for moving the collar in order to move the filtration unit within the receptacle for filtering at least a portion of the sample fluid contained in the receptacle.

In one embodiment, the sample injector is configured to remove and replace the needle, in other words, the needle is a replaceable component, e.g. a consumable, which needs to be replaced for example when worn out, as known in the art.

In one embodiment, a separation system is provided for separating compounds of a sample fluid in a mobile phase. The fluid separation system comprises a mobile phase drive, preferably a pumping system, adapted to drive the mobile phase through the fluid separation system; a separation unit, preferably a chromatographic column, adapted for separating compounds of the sample fluid in the mobile phase; and a sample injector according to any of the aforedescribed embodiments adapted to introduce the sample fluid into the mobile phase.

The separation system may further comprise one or more of: a detector adapted to detect separated compounds of the sample fluid; a collection unit adapted to collect separated compounds of the sample fluid; a data processing unit adapted to process data received from the fluid separation system; and a degassing apparatus for degassing the mobile phase.

In one embodiment of the separation system comprises a sampling volume being or comprising at least one of a group of: a sample loop, a sample volume, a trap volume, a trap column, a fluid reservoir, a capillary, a tube, a microfluidic channel structure. The sampling volume may be configured for receiving and buffering the sample fluid aspirated by the needle before being injected into the mobile phase.

In one embodiment of the injector, the needle comprises an elongated shape with an open end for fluid aspiration, and may be or comprise at least one of a conduit and a nozzle. The open end may be preferably coupled to another open end of a fluid path, preferably a needle seat, in a fluid-tight manner. The needle may have a sharpened end e.g. configured for penetrating through a surface (e.g. a cap or other coverage covering the receptacle), but may also be embodied without such sharpened end, e.g. having a blunt end. Further, while the needle is preferably embodied using a substantially rigid material, such as a metal (e.g. stainless steel), ceramic, et cetera, softer materials may be applied as well e.g. allowing to bend the needle (e.g. in the sense of a soft(er) tubing).

In one embodiment, at least one of the mobile phase drive and the fluid drive is or comprises at least one of: a syringe, a syringe pump, a peristaltic pump or roller pump, a venturi valve coupled to a fluid flow generating unit, a pump, and a pumping unit comprising a plurality of pumps, a piston pump, preferably a reciprocating piston pump, a dual pump comprising two piston pumps connected in parallel or serial to each other, a multi-stage step-piston pump, and a modulation pump.

In one embodiment, the needle is configured for aspirating the sample fluid from the receptacle by immersing the needle into the receptacle and driving the fluid drive.

The sample fluid can be drawn in by the fluid drive from the receptacle by the needle. The drawn in sample fluid may be transported directly to or into the sampling volume, however, any kind of transport mechanisms may be applied accordingly as well, e.g. pushing the sample fluid or a combined draw and push scheme so that the sample fluid, or parts thereof, is partly drawn and partly pushed. This may be executed by the fluid drive only or in conjunction with one or more fluid transport devices or mechanisms.

In one embodiment, the processing unit is configured to control the needle to immerse into the sample fluid within the receptacle and to operate the fluid drive to aspirate a portion of the sample fluid from the receptacle into the needle.

Embodiments of the present invention might be embodied based on most conventionally available HPLC systems, such as the Agilent 1220, 1260 and 1290 Infinity LC Series (provided by the applicant Agilent Technologies).

One embodiment of an HPLC system comprises a pumping apparatus having a piston for reciprocation in a pump working chamber to compress liquid in the pump working chamber to a high pressure at which compressibility of the liquid becomes noticeable.

The separating device preferably comprises a chromatographic column providing the stationary phase. The column might be a glass, metal, ceramic or a composite material tube (e.g. with a diameter from 50 µm to 5 mm and a length of 1 cm to 1 m) or a microfluidic column (as disclosed e.g. in EP 1577012 A1 or the Agilent 1200 Series HPLC-Chip/MS System provided by the applicant Agilent Technologies). The individual components are retained by the stationary phase differently and separate from each other while they are propagating at different speeds through the column with the eluent. At the end of the column they elute at least partly separated from each other. During the entire chromatography process the eluent might be also collected in a series of fractions. The stationary phase or adsorbent in column chromatography usually is a solid material. The most common stationary phase for column chromatography is silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface, which can be especially chemically modified, though in EBA a fluidized bed is used.

The mobile phase (or eluent) can be either a pure solvent or a mixture of different solvents. It can also contain additives, i.e. be a solution of the said additives in a solvent or a mixture of solvents. It can be chosen e.g. to adjust the retention of the compounds of interest and/or the amount of mobile phase to run the chromatography. The mobile phase can also be chosen so that the different compounds can be separated effectively. The mobile phase might comprise an organic solvent like e.g. methanol or acetonitrile, often diluted with water. For gradient operation, water and organic solvent are delivered in separate containers, from which the gradient pump delivers a programmed blend to the system. Other commonly used solvents may be isopropanol, tetrahydrofuran (THF), hexane, ethanol and/or any combination thereof or any combination of these with aforementioned solvents.

The sample fluid might comprise any type of process liquid, natural sample like juice, body fluids like plasma or it may be the result of a reaction like from a fermentation broth.

The fluid is preferably a liquid but may also be or comprise a gas and/or a supercritical fluid (as e.g. used in supercritical fluid chromatography—SFC—as disclosed e.g. in U.S. Pat. No. 4,982,597 A).

The pressure in the mobile phase might range from 2-200 MPa (20 to 2000 bar), in particular 10-150 MPa (100 to 1500 bar), and more particularly 50-130 MPa (500 to 1300 bar).

The HPLC system might further comprise a detector for detecting separated compounds of the sample fluid, a fractionating unit for outputting separated compounds of the sample fluid, or any combination thereof. Further details of HPLC systems are disclosed with respect to the aforementioned Agilent HPLC series, provided by the applicant Agilent Technologies.

Embodiments of the invention can be partly or entirely embodied or supported by one or more suitable software programs or products (or software), which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) can be preferably applied in or by the control unit, e.g. a data processing system such as a computer, preferably for executing any of the methods described herein. For example, one embodiment of the present disclosure provides a non-transitory computer-readable medium that includes instructions stored thereon, such that when executed on a processor, the instructions perform the steps of the method of any of the embodiments disclosed herein.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.) or finer separated by the first separation criterion, thereby splitting up or separating a separate fraction into a plurality of sub-fractions.

In the context of this application, the term "sample separation apparatus", "fluid separation apparatus" or similar may particularly denote any apparatus which is capable of separating different fractions of a fluidic sample by applying a certain separation technique. Particularly, two separation apparatus may be provided in such a sample separation apparatus when being configured for a two-dimensional separation. This means that the sample is first separated in accordance with a first separation criterion, and at least one or some of the fractions resulting from the first separation are subsequently separated in accordance with a second, different, separation criterion or more finely separated in accordance with the first separation criterion.

The term "separation unit", "separation device" or similar may particularly denote a fluidic member through which a fluidic sample is transferred, and which is configured so that, upon conducting the fluidic sample through the separation unit, the fluidic sample will be separated into different groups of molecules or particles (called fractions or subfractions, respectively). An example for a separation unit is a liquid chromatography column which is capable of trapping or retaining and selectively releasing different fractions of the fluidic sample.

In the context of this application, the term "fluid drive", "mobile phase drive" or similar may particularly denote any kind of pump which is configured for forcing a flow of mobile phase and/or a fluidic sample along a fluidic path.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

DETAILED DESCRIPTION

Figure 1:
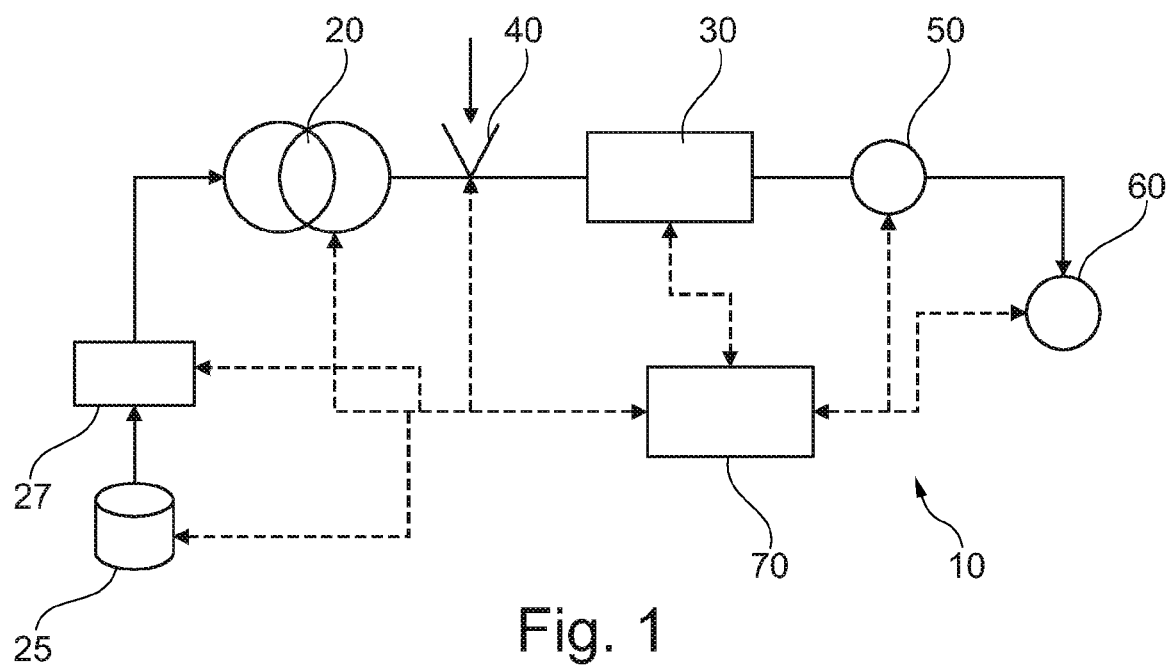
FIG. 1 illustrates a liquid chromatography system according to an exemplary embodiment.

Referring now in greater detail to the drawings, FIG. 1 depicts a general schematic of a liquid separation system 10. A mobile phase drive 20 (such as a pump) receives a mobile phase from a solvent supply 25, typically via a degasser 27, which degases the mobile phase and thus reduces the amount of dissolved gases in it. The mobile phase drive 20 drives the mobile phase through a separating device 30 (such as a chromatographic column). A sample injector 40 (also referred to as sample introduction apparatus, sample dispatcher, etc.) is provided between the mobile phase drive 20 and the separating device 30 in order to subject or add (often referred to as sample introduction) portions of one or more sample fluids into the flow of a mobile phase. The separating device 30 is adapted for separating compounds of the sample fluid, e.g. a liquid. A detector 50 is provided for detecting separated compounds of the sample fluid. A fractionating unit 60 can be provided for outputting separated compounds of sample fluid. In one embodiment, at least parts of the sample injector 40 and the fractionating unit 60 can be combined, e.g. in the sense that some common hardware is used as applied by both of the sample injector 40 and the fractionating unit 60.

The separating device 30 may comprise a stationary phase configured for separating compounds of the sample fluid. Alternatively, the separating device 30 may be based on a different separation principle (e.g. field flow fractionation).

While the mobile phase can be comprised of one solvent only, it may also be mixed of plurality of solvents. Such mixing might be a low pressure mixing and provided upstream of the mobile phase drive 20, so that the mobile phase drive 20 already receives and pumps the mixed solvents as the mobile phase. Alternatively, the mobile phase drive 20 might be comprised of plural individual pumping units, with plural of the pumping units each receiving and pumping a different solvent or mixture, so that the mixing of the mobile phase (as received by the separating device 30) occurs at high pressure and downstream of the mobile phase drive 20 (or as part thereof). The composition (mixture) of the mobile phase may be kept constant over time, the so-called isocratic mode, or varied over time, the so-called gradient mode.

A data processing unit 70, which can be a conventional PC or workstation, might be coupled (as indicated by the dotted arrows) to one or more of the devices in the liquid separation system 10 in order to receive information and/or control operation. For example, the data processing unit 70 might control operation of the mobile phase drive 20 (e.g. setting control parameters) and receive therefrom information regarding the actual working conditions (such as output pressure, flow rate, etc. at an outlet of the pump). The data processing unit 70 might also control operation of the solvent supply 25 (e.g. monitoring the level or amount of the solvent available) and/or the degasser 27 (e.g. setting control parameters such as vacuum level) and might receive therefrom information regarding the actual working conditions (such as solvent composition supplied over time, flow rate, vacuum level, etc.). The data processing unit 70 might further control operation of the sample injector 40 (e.g. controlling sample introduction or synchronization of the sample introduction with operating conditions of the mobile phase drive 20). The separating device 30 might also be controlled by the data processing unit 70 (e.g. selecting a specific flow path or column, setting operation temperature, etc.), and send—in return—information (e.g. operating conditions) to the data processing unit 70. Accordingly, the detector 50 might be controlled by the data processing unit 70 (e.g. with respect to spectral or wavelength settings, setting time constants, start/stop data acquisition), and send information (e.g. about the detected sample compounds) to the data processing unit 70. The data processing unit 70 might also control operation of the fractionating unit 60 (e.g. in conjunction with data received from the detector 50) and provide data back. The data processing unit 70 might also process the data received from the system or its part and evaluate it in order to represent it in adequate form prepared for further interpretation.

Figure 2:
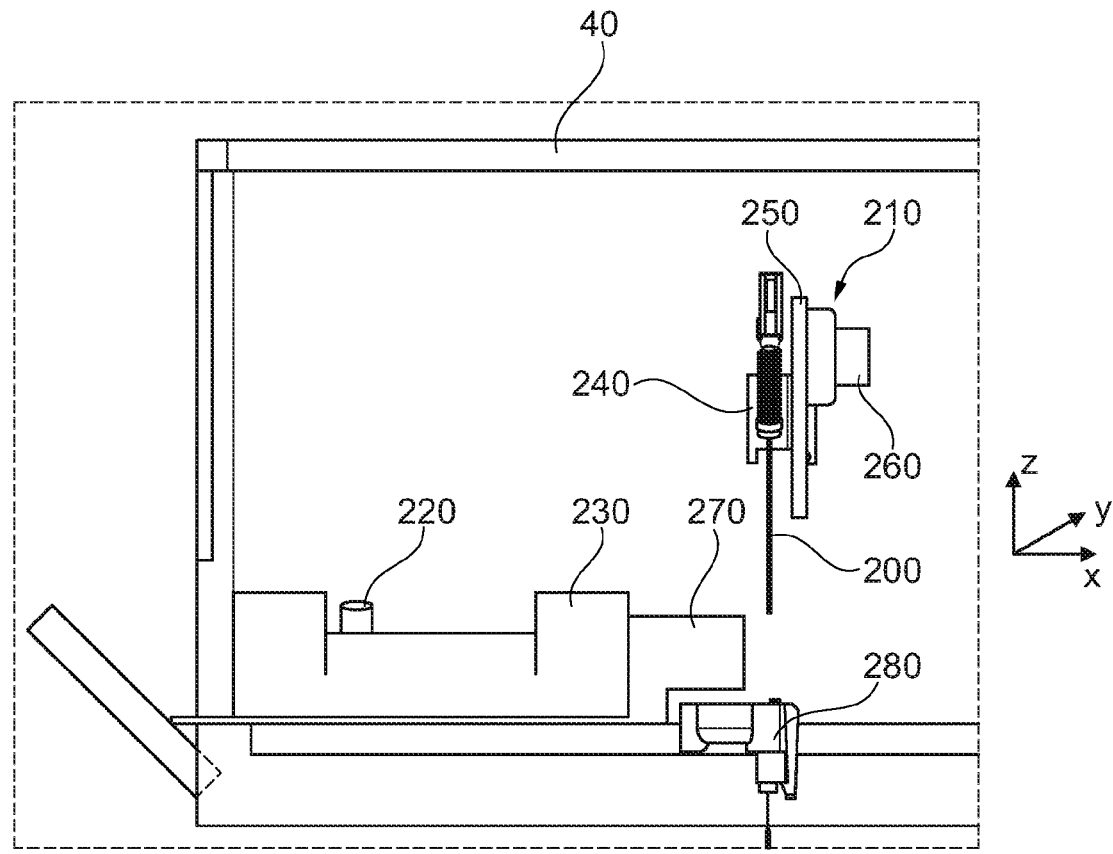
FIG. 2 illustrates an embodiment of a sample injector.

FIG. 2 illustrates in greater detail an embodiment of the sample injector 40. The sample injector 40 comprises a needle 200 and a handling unit 210 configured for moving and positioning the needle 200. One or more receptacles 220, which may comprise e.g. a sample fluid to be injected by the sample injector 40, can be provided e.g. in a tray 230, such as a vial plate or any other container as known in the art. In the example of FIG. 2, only one receptacle 220 shall be represented for the sake of simplicity.

The positioning of the needle 200 as provided by the handling unit 210 may be only in Z-direction, as indicated the axis diagram, allowing to position the needle 200 in (only) height e.g. by lowering or lifting the needle 200 in Z-direction. For such purpose, the handling unit 210 may comprise a slider 240 configured to slide in Z-direction along a guide 250, e.g. operated by a drive unit 260 which may be an electrical motor.

The handling unit 210 may further be configured to move and position the needle 200 into the X-direction and/or into the Y-direction (as indicated in the axis diagram), as readily known in the art.

The tray 230 as shown in the embodiment of FIG. 2 is positioned on a movable sleigh 270, which may be moved into the X-direction and/or into the Y-direction (as indicated in the axis diagram), as readily known in the art, in order to position the one or more receptacles 220 with respect to the needle 200.

In the exemplary embodiment of FIG. 2, the sleigh 270 is configured to be movable in X-direction, while the handling unit 210 is configured to move the needle 200 as well in Z-direction as in Y-direction. However, it is clear that other mechanisms of (relative) movement may be applied accordingly, including rotational movements and combinations thereof.

A needle seat 280 is provided into which the needle 200 can be seated (e.g., by operation of the handling unit 210) allowing to fluidically couple the needle 200 with the high-pressure flow path between the pump 20 and the separating device 30 of the liquid separation system 10, e.g. in order to inject a sample fluid (aspirated into the needle 200 from the container 220) into such high pressure flow path for chromatographic separation by the separating device 30. Such injection may be by feed injection, as described e.g. in the aforementioned US2017343520A1, and/or by flow through injection, as described e.g. in the aforementioned US20160334031A1.

Figure 3:
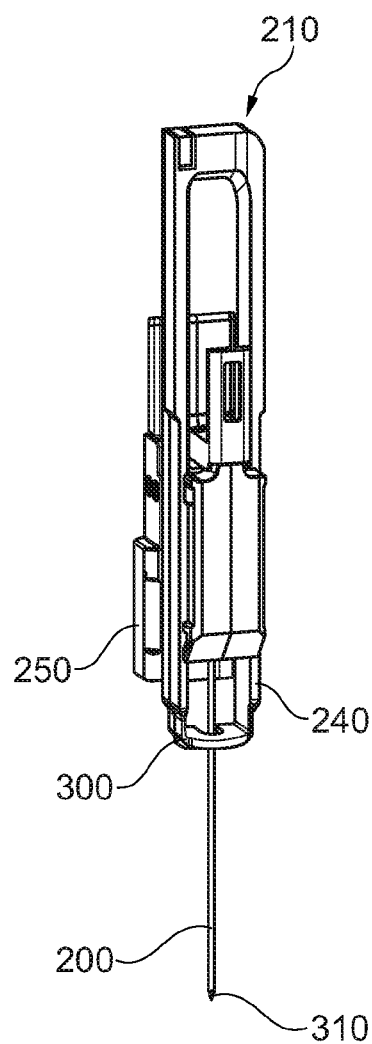
FIG. 3 illustrates an embodiment of a handling unit containing a needle.

FIG. 3 shows in greater detail an embodiment of the handling unit 210 containing the needle 200. The needle 200 is preferably embodied as a replaceable unit to be inserted into the handling unit 210 and which may be removed from the handling unit 210. The needle 200 may be removed from the handling unit 210 e.g. for replacement (for example when the needle 200 has been worn out and needs to be replaced) or when positioning the needle 200 into the needle seat 280. One or more additional needles may be provided so that the handling unit 210 may be equipped with a different needle after having positioned a respective needle into the needle seat 280, thus e.g. allowing a continuous operation even during injection.

In the embodiment of FIG. 3, the needle 200 is inserted into the slider 240, and the slider 240 can be moved (e.g., slightly) in Z-direction along the guide 250. The slider 240 comprises a pusher 300 situated at its lower end in Z-direction, i.e. in close proximity to a needle tip 310 bearing an opening into the needle 200 and through which fluid may be aspirated into the needle 200 or pushed out from the needle 200. The function of the pusher 300 will be explained in more detail later.

Figure 4:
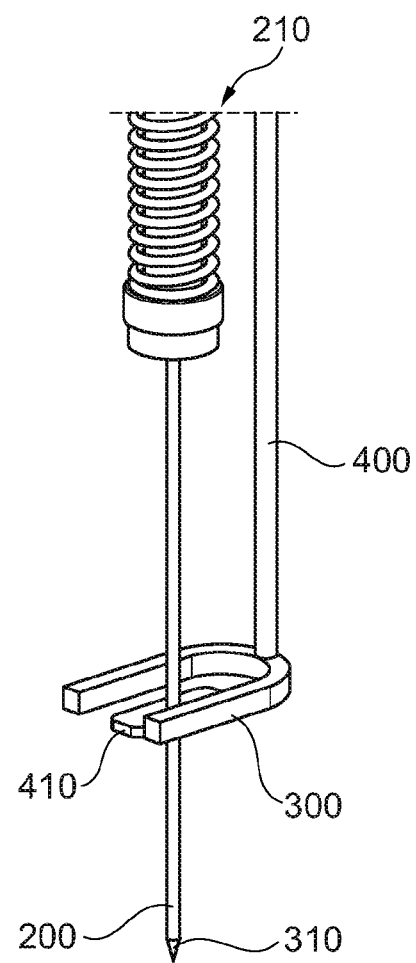
FIG. 4 illustrates another embodiment of a handling unit containing a needle.

FIG. 4 illustrates another exemplary embodiment of the pusher 300 (as part of the handling unit 210 similar as in FIG. 3) as well as of the needle 200. The pusher 300 is embodied as a U-shape extending via a rod 400 being part of the handling unit 210. The needle 200 comprises a collar 410 being fixed to the needle 200 and laterally (i.e. perpendicular to the direction of elongation of the needle 200) extending therefrom.

In both embodiments of FIGS. 3 and 4, the needle 200 can be fixedly inserted into the slider 240 allowing to move the needle 200 in Z-direction. The pusher 300 can be embodied fixedly with the slider 240, so that the needle 200 as well as the pusher 300 can move simultaneously with a movement of the slider 240.

Alternatively, the pusher 300 may be embodied to be movable independently of a movement of the needle 200, allowing to move—in Z-direction—the pusher 300 independently of a movement of the needle 200. In the embodiment of FIG. 3, the pusher 300 may be slidably provided and independently driven in Z-direction. In the embodiment of FIG. 4, the rod 400 can be moved in Z-direction independently of a movement in Z-direction of the needle 200.

Figure 5A:
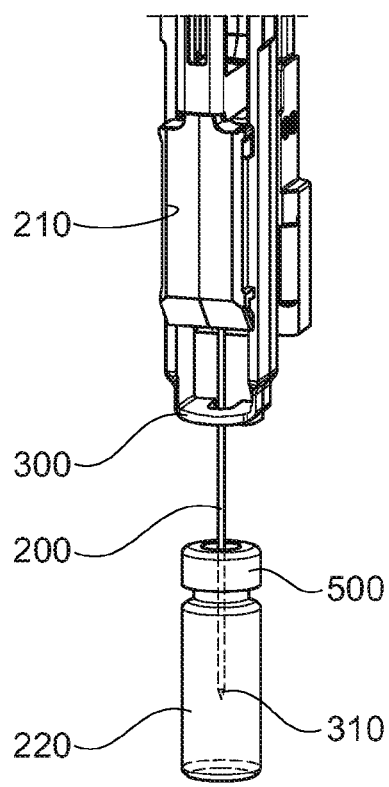
FIG. 5A illustrates an embodiment of a mode of operation of a handling unit.

FIGS. 5A-D illustrate a preferred embodiment of a mode of operation of the handling unit 210 similar to the embodiment as shown in FIG. 3. In FIG. 5A, the needle 200 is partly immersed into the receptacle 220 containing a sample fluid. In order to aspirate sample fluid from the receptacle 220, at least the needle tip 310 needs to be fully immersed into the sample fluid. As indicated in the embodiment of FIG. 5A, the needle 200 may be pinned (or pierced) through a cap 500 covering the receptacle 220, which may be a commercially available vial or any other type of receptacle. The needle 200 has been lowered (in Z-direction) via the handling unit 210 into the receptacle 220. After sufficiently aspirating sample fluid from the receptacle 220, the handling unit 220 may lift the needle 200 out of the receptacle 220 (not shown in FIG. 5A).

Figure 5B:
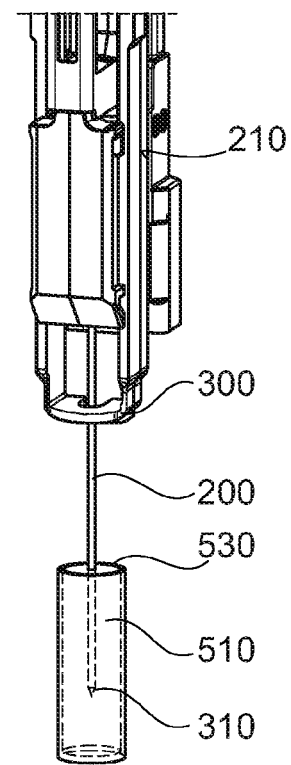
FIG. 5B is another illustration of the mode of operation relating to FIG. 5A.

Before further using the sample fluid aspirated in FIG. 5A, e.g. by injecting into the high-pressure path as depicted in FIG. 1, the sample fluid shall be subjected to a filtering process. For such filtering purpose, the handling unit 210 will lower the needle 200 into a filtering receptacle 510 (as depicted in FIG. 5B) and eject at least a portion of the aspirated sample fluid into the filtering receptacle 510.

Figure 5C:
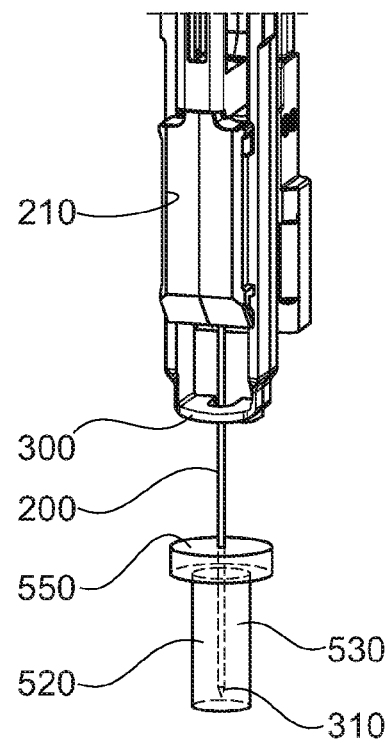
FIG. 5C is another illustration of the mode of operation relating to FIG. 5A.

The needle 200 may then be removed out of and away from the filtering receptacle 510 and pinned into a filter element 520, as shown in FIG. 5C. The filter element 520 is configured so that it will attach to the needle 200 after the needle 200 has been sufficiently penetrated into it, e.g. as result of frictional forces, as readily known in the art, so that the filter element 520 can now be moved with the needle 200.

Figure 5D:
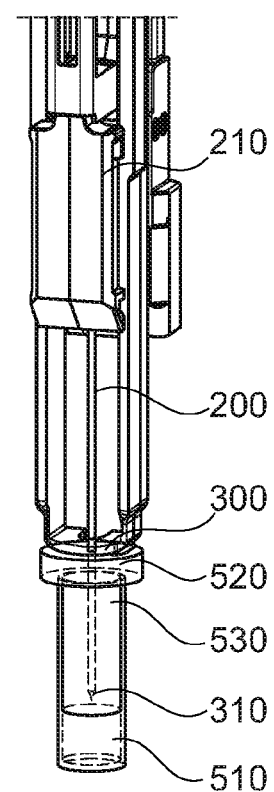
FIG. 5D is another illustration of the mode of operation relating to FIG. 5A.

The handling unit 210 can then move the filter element 520 attached to the needle 200 and position the filter element 520 beyond an opening 530 (best seen in FIG. 5B) of the filtering receptacle 510 or already slightly into the filtering receptacle 510. As shown in FIG. 5D, the handling unit 210 can then lower the pusher 300 in direction of the shown arrow in order to push the filter element 520 (further) down into the filtering receptacle 510. This, in turn, will drive the sample fluid contained in the filtering receptacle 510 through the filter element 520 into an inner chamber 530 within the filter element 520. The needle tip 310 immersed into the inner chamber 530 may then aspirate the filtered sample fluid into the needle 200.

It is clear that other filter elements 520, allowing to filter the sample fluid by pushing such filter element 520 through the sample fluid, than the specific embodiment shown in FIG. 5 can be applied accordingly, with the pusher 300 being operated to provide the pushing movement required for applying the filtering.

In the embodiment of FIG. 5 and best visible by FIGS. 5C-D, the pusher 300 can be operated and moved (into the Z-direction as indicated by the arrow in FIG. 5D) independently of the needle 200, so that the needle 200 can remain in its position during the process of pushing the filter element 520 through the sample fluid. It is clear, however, that also a combined operation and movement of the needle 200 and the pusher 300 may be applied accordingly.

The filtered sample fluid aspirated from the inner chamber 530, as illustrated in FIG. 5D, can then be further processed e.g. by injecting into the high-pressure path of the mobile phase as provided by the pump 20.

Instead of using the pusher 300, the filter element 520 may also be pushed into the filtering receptacle 510 by means of the embodiment of the needle 200 as shown in FIG. 4. In such case, the collar 410 of the needle 200 can ensure that the filter element 520 can be pushed into the filtering receptacle 510. In such embodiment, the needle 200 can be penetrated into the filter element 520 (similar as shown in FIG. 5C) at maximum until the collar 410 will abut to an upper surface 550 (indicated in FIG. 5C) of the filter element 520. When the needle 200 together with the filter element 520 is positioned beyond the filtering receptacle 510 as shown in FIG. 5D, the filter element 520 will be pushed (further) into the filtering receptacle 510 when the needle 200 is moved in the direction of the arrow, the latest as soon as the collar 410 abuts to the upper surface 550. It is clear that dependent on the friction properties between needle 200 and filter element 520, the needle 200 might already push the filter element 520 into the filtering receptacle even before abutment of the collar 410 to the upper surface 550.

While the filtering process shown in FIG. 5 has been illustrated for a sequence of sample preparation steps including removing the sample fluid from the receptacle 220 into the filtering receptacle 510 (FIGS. 5A-B) and grabbing the filter element 520, it is clear that the process of filtering can be applied directly as shown with respect to FIG. 5D.

The invention claimed is:

1. A method of operating a sample injector for a chromatography system, the method comprising:
   providing the chromatography system, comprising:
      a mobile phase drive and a separation unit, wherein the mobile phase drive is configured to drive a mobile phase through the separation unit, and the separation unit is configured to chromatographically separate compounds of a sample fluid in the mobile phase; and
      the sample injector, wherein the sample injector is configured to inject the sample fluid into the mobile phase and comprises a needle, a handling unit configured to position the needle, and a further unit;
   providing a filter element configured to filter the sample fluid;
   pinning the needle into the filter element to attach the filter element to the needle;
   moving the filter element attached to the needle into a receptacle;
   operating the further unit to move the filter element within the receptacle to filter at least a portion of the sample fluid contained in the receptacle, thereby forming a filtered sample fluid;
   operating the handling unit to position the needle into the receptacle; and
   aspirating a volume of the filtered sample fluid from the receptacle.

2. The method of claim 1, wherein operating the further unit to move the filter element within the receptacle comprises one of:
   moving the further unit independently of a movement of the needle; or
   moving the further unit simultaneously with a movement of the needle.

3. The method of claim 1, wherein moving the filter element within the receptacle comprises at least one of:
   moving the filter element from an upper position proximate to an opening of the receptacle towards a lower position proximate to a bottom side of the receptacle, wherein the opening is configured for receiving the needle into the receptacle;
   operating the handling unit to move the filter element within the receptacle;
   operating the handling unit to move the further unit to thereby move the filter element within the receptacle; and,
   operating the needle to move the filter element within the receptacle.

4. The method of claim 1, wherein operating the handling unit to position the needle into the receptacle comprises:
   positioning a tip of the needle close to an upper surface of the filter element, wherein the upper surface of the filter element is oriented adjacent to an opening of the receptacle.

5. The method of claim 1, further comprising, before moving the filter element within the receptacle:
   aspirating the sample fluid into the needle; and
   ejecting at least a portion of the aspirated sample fluid into the receptacle.

6. The method of claim 1, further comprising
   injecting at least a portion of the aspirated volume of the filtered sample fluid into the mobile phase.

7. The method of claim 1, comprising one of:
   wherein the further unit comprises a pusher movable by the handling unit; or
   wherein the further unit comprises a collar disposed at a lateral side of the needle and is movable with the needle by the handling unit.

8. The method of claim 1, wherein operating the further unit to move the filter element within the receptacle comprises bringing the further unit into contact with the filter element.

9. A non-transitory computer-readable medium with instructions stored thereon, that when executed by a processor, control the steps, in the method of claim 1, of pinning the needle, moving the filter element, operating the further unit, operating the handling unit, and aspirating the volume of the filtered sample fluid.

10. A sample injector for injecting a sample fluid into a mobile phase in a chromatography system, the sample injector comprising:
   a needle;
   a handling unit configured to position the needle;
   a further unit; and
   a processing unit configured to control an operation comprising:
   controlling the handling unit to position the needle into a filter element configured to filter the sample fluid;
   controlling the handling unit to move the filter element attached to the needle into a receptacle;
   controlling the further unit to move a filter element within the receptacle containing the sample fluid, to filter at least a portion of the sample fluid contained in the receptacle and thereby form a filtered sample fluid;
   controlling the handling unit to position the needle into the receptacle; and
   controlling aspirating a volume of the filtered sample fluid.

11. The sample injector of claim 10, wherein
   the further unit comprises a pusher movable by the handling unit.

12. The sample injector of claim 10, wherein
   the further unit is integrated into the handling unit.

13. The sample injector of claim 10, wherein
   the handling unit comprises a guide and a slider configured to slide along the guide, and the needle is inserted into the slider.

14. The sample injector of claim 10, wherein:
the further unit is configured to move independently of a movement of the needle; or
the further unit is configured to move simultaneously with a movement of the needle.

15. The sample injector of claim 10, wherein the further unit comprises a collar disposed at a lateral side of the needle, and the handling unit is configured to move the collar to move the filter element within the receptacle.

16. A chromatography system, comprising:
a mobile phase drive;
a separation unit,
  wherein the mobile phase drive is configured to drive a mobile phase through the separation unit, and the separation unit is configured to separate compounds of a sample fluid in the mobile phase; and
the sample injector according to claim 10.

17. A method of operating a sample injector for a chromatography system, the method comprising:
providing the chromatography system, comprising:
  a mobile phase drive and a separation unit, wherein the mobile phase drive is configured to drive a mobile phase through the separation unit, and the separation unit is configured to chromatographically separate compounds of a sample fluid in the mobile phase; and
  the sample injector, wherein the sample injector is configured to inject the sample fluid into the mobile phase and comprises a needle, a handling unit configured to position the needle, and a further unit;
providing a filter element configured to filter the sample fluid;
aspirating the sample fluid into the needle;
ejecting at least a portion of the aspirated sample fluid into a receptacle;
operating the further unit to move the filter element within the receptacle to filter at least a portion of the sample fluid contained in the receptacle, thereby forming a filtered sample fluid;
operating the handling unit to position the needle into the receptacle; and
aspirating a volume of the filtered sample fluid from the receptacle.

18. The method of claim 17, comprising:
pinning the needle into the filter element to attach the filter element to the needle; and
moving the filter element attached to the needle into the receptacle.

19. A method of operating a sample injector for a chromatography system, the method comprising:
providing the chromatography system, comprising:
  a mobile phase drive and a separation unit, wherein the mobile phase drive is configured to drive a mobile phase through the separation unit, and the separation unit is configured to chromatographically separate compounds of a sample fluid in the mobile phase; and
  the sample injector, wherein the sample injector is configured to inject the sample fluid into the mobile phase and comprises a needle, a handling unit configured to position the needle, and a further unit;
providing a filter element configured to filter the sample fluid;
operating the further unit to move the filter element within a receptacle to filter at least a portion of the sample fluid contained in the receptacle, thereby forming a filtered sample fluid, wherein the further unit is moved independently of a movement of the needle;
operating the handling unit to position the needle into the receptacle; and
aspirating a volume of the filtered sample fluid from the receptacle.

20. The method of claim 19, comprising:
pinning the needle into the filter element to attach the filter element to the needle; and
moving the filter element attached to the needle into the receptacle.

* * * * *